United States Patent
Loesch

(10) Patent No.: US 11,698,451 B2
(45) Date of Patent: Jul. 11, 2023

(54) METHOD AND DEVICE FOR EVALUATING THE ANGULAR POSITION OF AN OBJECT, AND DRIVER ASSISTANCE SYSTEM

(71) Applicant: Robert Bosch GmbH, Stuttgart (DE)

(72) Inventor: Benedikt Loesch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 247 days.

(21) Appl. No.: 16/767,838

(22) PCT Filed: Nov. 15, 2018

(86) PCT No.: PCT/EP2018/081482
§ 371 (c)(1),
(2) Date: May 28, 2020

(87) PCT Pub. No.: WO2019/141407
PCT Pub. Date: Jul. 25, 2019

(65) Prior Publication Data
US 2020/0379101 A1    Dec. 3, 2020

(30) Foreign Application Priority Data
Jan. 18, 2018   (DE) .......................... 102018200752.7

(51) Int. Cl.
*G01S 13/72* (2006.01)
*H04B 17/309* (2015.01)
(Continued)

(52) U.S. Cl.
CPC ............. *G01S 13/72* (2013.01); *B60W 40/00* (2013.01); *G01S 7/4021* (2013.01);
(Continued)

(58) Field of Classification Search
CPC ...... G01S 13/72; G01S 7/4021; G01S 13/589; H04B 17/309; B60W 40/00; B60W 2420/52
See application file for complete search history.

(56) References Cited

U.S. PATENT DOCUMENTS

| | | | |
|---|---|---|---|
| 8,112,223 B2 * | 2/2012 | Jordan ................. | G01S 13/878 701/96 |
| 2005/0062615 A1 * | 3/2005 | Braeuchle ............ | G01S 13/867 340/903 |

(Continued)

FOREIGN PATENT DOCUMENTS

| | | | | |
|---|---|---|---|---|
| DE | 102007027126 A1 * | 1/2008 | .......... | G01S 17/936 |
| DE | 102015116434 A1 | 3/2017 | | |

(Continued)

OTHER PUBLICATIONS

International Search Report for PCT/EP2018/081482, dated Feb. 27, 2019.

*Primary Examiner* — Peter M Bythrow
*Assistant Examiner* — Nazra Nur Waheed
(74) *Attorney, Agent, or Firm* — Norton Rose Fulbright US LLP; Gerard Messina

(57) ABSTRACT

A method for evaluating an angular position of an object recognized on the basis of radar data, the radar data being ascertained by a radar device. The method includes: ascertaining of an intrinsic speed of the radar device; ascertaining a relative speed of the recognized object in relation to the radar device, using the ascertained radar data; ascertaining at least one angular test region using the ascertained intrinsic speed and the ascertained relative speed, the at least one angular test region corresponding to possible stationary objects that have a relative speed that substantially corresponds to the ascertained relative speed; and ascertaining (Continued)

whether an azimuth angle of the recognized object lies in the ascertained angular test region.

8 Claims, 3 Drawing Sheets

(51) Int. Cl.
*B60W 40/00* (2006.01)
*G01S 7/40* (2006.01)
*G01S 13/58* (2006.01)

(52) U.S. Cl.
CPC .......... *G01S 13/589* (2013.01); *H04B 17/309* (2015.01); *B60W 2420/52* (2013.01)

(56) References Cited

U.S. PATENT DOCUMENTS

| | | |
|---|---|---|
| 2011/0068970 A1 | 3/2011 | Mitsumoto |
| 2017/0131392 A1 | 5/2017 | Schoor et al. |
| 2017/0261599 A1 | 9/2017 | Zeng et al. |
| 2018/0301819 A1* | 10/2018 | Kirino ...................... G01S 1/00 |

FOREIGN PATENT DOCUMENTS

| | | | | |
|---|---|---|---|---|
| EP | 3239737 A1 | 11/2017 | | |
| EP | 3267217 A1 * | 1/2018 | ............ | G01S 13/42 |
| EP | 3267217 A1 | 1/2018 | | |
| JP | 2008082974 A | 4/2008 | | |
| JP | 2016075524 A | 5/2016 | | |
| JP | 2016525209 A | 8/2016 | | |
| JP | 2016156725 A | 9/2016 | | |
| WO | WO-2017191201 A1 * | 11/2017 | ............ | G01S 13/42 |

* cited by examiner

METHOD AND DEVICE FOR EVALUATING THE ANGULAR POSITION OF AN OBJECT, AND DRIVER ASSISTANCE SYSTEM

FIELD

The present invention relates to a method for evaluating an angular position of an object recognized on the basis of radar data, and to a corresponding device. In addition, the present invention relates to a driver assistance system for a vehicle.

BACKGROUND INFORMATION

In addition to the calculation of distances and relative speeds, azimuth angles and elevation angles of objects can also be determined on the basis of radar data. These measurement variables can be evaluated by driver assistance systems in order to control particular vehicle functions. On the basis of the elevation angle, it can in addition be recognized whether an object can be driven over, driven against, or driven under. In particular, the angle of the object has to be determined accurately in order to allocate objects to lanes.

In addition to conventional radar devices, conventional multiple-input-multiple-output (MIMO) radar devices have a large number of transmit antennas and receive antennas. With an enlarged virtual aperture of the overall array and a larger number of measurements, at the same time the costs for additional channels and space on the circuit board can be saved.

In order to obtain orthogonal transmit signals, code-division multiplexing methods, frequency-division multiplexing methods, or time-division multiplexing methods can be used.

U.S. Patent Application Publication No. US 2017/0131392 A1 describes an MIMO radar sensor in which, using an FMCW modulation method, frequency ramps are emitted in an interleaved manner and the reflections are received. The radar sensor facilitates the determination of the angular position of an object.

In particular in the case of large angular regions and a high object resolution, which makes the detection of weaker targets possible, the computing expense for the angular estimation may however be significant. There is therefore a need for more efficient methods for angular estimation.

SUMMARY

The present invention relates to a method for evaluating an angular position of an object recognized on the basis of radar data, and to a device for evaluating an angular position of an object recognized on the basis of radar data.

According to a first aspect, the present invention provides a method for evaluating an angular position of an object recognized on the basis of radar data, the radar data being ascertained by a radar device. In accordance with an example embodiment of the present invention, in the method, an intrinsic speed of the radar device is ascertained. In addition, a relative speed of the recognized object in relation to the radar device is ascertained using the ascertained radar data. At least one angular test region is ascertained using the ascertained intrinsic speed and the ascertained relative speed, the at least one angular test region corresponding to possible stationary objects that have a relative speed that corresponds substantially to the ascertained relative speed. In addition, it is ascertained whether an azimuth angle of the recognized object lies in the ascertained angular test region.

According to a second aspect, the present invention provides a device for evaluating an angular position of an object recognized on the basis of radar data. In accordance with an example embodiment of the present invention, the device has an interface that receives the radar data ascertained by a radar device, and receives information relating to an intrinsic speed of the radar device. The device further includes a computing device that ascertains a relative speed of the recognized object in relation to the radar device, using the ascertained radar data. The computing device ascertains at least one angular test region, using the ascertained intrinsic speed and the received relative speed. The at least one angular test region corresponds to possible stationary objects that have a relative speed that corresponds substantially to the ascertained relative speed. The computing device further ascertains whether an azimuth angle of the recognized object lies within the ascertained angular test region.

According to a third aspect, the present invention provides an example driver assistance system for a vehicle that has a radar device that ascertains radar data and recognizes an object on the basis of the radar data. The driver assistance system further includes an example device for evaluating an angular position of the recognized object.

Preferred specific embodiments of the present invention are described herein.

The present invention is based on the recognition that a large portion of the objects acquired by a radar device of a vehicle are static, or stationary. According to the present invention, it is therefore first checked whether the received radar signals correspond to such stationary targets. Through such a pre-search, the computing expense can be significantly reduced, because only a relatively narrow angular region has to be checked. It can be provided that a search is done for objects in additional, further angular regions only if this pre-search is not successful. The present invention thus enables a typically significantly faster acquisition of the objects with reduced computing expense, and thus reduced energy consumption.

According to a preferred development of the method, an angular quality measure is calculated using the radar data, it being ascertained that the azimuth angle of the recognized object is in the ascertained angular test region if the angular quality measure exceeds a specified threshold value. The angular estimation itself can be carried out for example using a deterministic maximum likelihood (DML) method. The angular quality measure can be defined by the following equation:

$$P_{corr,1-Ziel} = e^{-x} \cdot \sum_{k=0}^{m-2} \frac{x^k}{k!}, x := m \cdot \langle SNR \rangle \cdot (1 - DML)$$

Here, DML designates the square of the absolute value of the cross-correlation $$|\underline{a}^H \underline{x}|^2$$

of the signal vector and the antenna diagram vector. In addition, $$P_{corr,1-target}$$

designates the probability that the measured DML value belongs to completely correlated signal and antenna diagram vectors. In addition, $$\langle SNR \rangle$$

designates the average signal-to-noise ratio after coherent integration via interleaved modulation sequences, and m designates the number of antennas of the radar device that are used for the angular estimation.

If the angular quality measure is already good enough in the pre-search, i.e., exceeds a specified threshold value, then it is recognized that the radar data are to be assigned to stationary objects, so that a further global search can be omitted. As a result, the angular estimation can be terminated after the pre-search.

If the angular quality measure falls below the specified threshold value, then, according to a preferred development of the method, it can be ascertained that the azimuth angle of the recognized object is not in the ascertained angular test region. In this case, there takes place an ascertaining of the azimuth angle outside the angular test region. Thus, if the pre-search is unsuccessful, a global search can follow. This relates to cases in which the radar data do not correspond to stationary targets, but rather to moving targets.

According to a preferred development of the example method according to the present invention, the at least one angular test region is determined on the basis of a mounting angle of the radar device. A mounting angle can be understood as an angle, measured in the plane of the roadway, between the main direction of radiation of the radar device and the longitudinal axis of the vehicle, or the direction of travel of the vehicle.

According to a preferred development of the example method of the present invention, the at least one angular test region is further ascertained taking into account a degree of accuracy of the ascertained intrinsic speed and/or a degree of accuracy of the ascertained relative speed. Stationary targets typically have a precise relationship between the relative speed and the object angle. However, if the intrinsic speed of the vehicle, or the relative speed, are not known accurately, then corresponding tolerance ranges result, so that the angular test regions have a certain width. The angular test regions themselves are however typically significantly smaller than the overall region of acquisition of the radar device.

According to a preferred development of the example method according to the present invention, at least one central angle is calculated that corresponds to a possible stationary object that has a relative speed that is equal to the ascertained relative speed. By varying the ascertained intrinsic speed and ascertained relative speed with attention to accuracy, a respective angular test region around the central angle is ascertained. The central angle is thus the angle that would correspond to an object that moved with exactly the measured relative speed, where the vehicle is also moving with exactly its intrinsic speed. Due to the imprecision in the intrinsic speed and the relative speed, the mentioned widening into respective angular test regions results.

According to a preferred development of the example method according to the present invention, overlapping angular test regions are combined to form an overall angular test region.

According to a preferred development of the example method according to the present invention, the ascertaining of whether the azimuth angle of the recognized object is in the ascertained angular test region takes place on the basis of a maximum likelihood method.

BRIEF DESCRIPTION OF THE DRAWINGS

In all the Figures, identical or functionally identical elements and devices are provided with the same reference characters.

DETAILED DESCRIPTION OF EXAMPLE EMBODIMENTS

Figure 1:
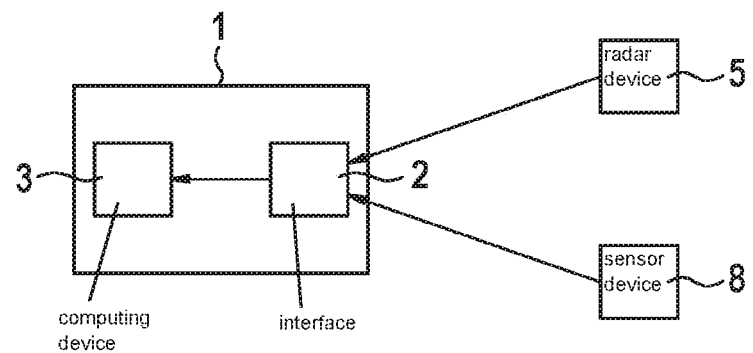
FIG. 1 shows a schematic diagram of a device for evaluating an angular position according to a specific embodiment of the present invention.

FIG. 1 shows a schematic diagram of a device 1 for evaluating an angular position of an object that was recognized on the basis of radar data. Device 1 includes an interface 2 that is coupled to a radar device 5 and receives radar data from this radar device. Radar device 5 is preferably designed as an MIMO radar device. In particular, the radar device can transmit various frequency ramps using a time-division multiplexing method, for example according to the method describe in U.S. Patent Application Publication No. US 2017/0131392 A1. Through suitable choice of the modulation method, an unambiguous determination of the distance and of the relative speed of the object can be carried out without requiring tracking over several cycles.

Interface 2 is also coupled to a sensor device 8 of the vehicle that is designed to measure an intrinsic speed of the vehicle. The measured intrinsic speed is transmitted to device 1 via interface 2.

Device 1 further has a computing device 3 that further evaluates the data received via interface 2. An object can be recognized either by radar device 5 or by computing device 3 on the basis of the radar data. In particular, peaks in a frequency spectrum are evaluated for this purpose. On the basis of the radar data, computing device 3 ascertains a relative speed of the recognized object in relation to the vehicle, or to radar device 5. The calculation of the relative speed can take place on the basis of conventional methods, taking into account the Doppler effect.

Computing device 3 further has knowledge of a mounting angle of radar device 5, which can for example be stored as a specified value in a memory of device 1.

Computing device 3 is designed to check whether the recognized object is a stationary target.

Given fixedly specified values of the mounting angle, the intrinsic speed of the vehicle, and the relative speed of the object, there result two possible angular constellations for the relative position between the vehicle and the object.

Figure 2:
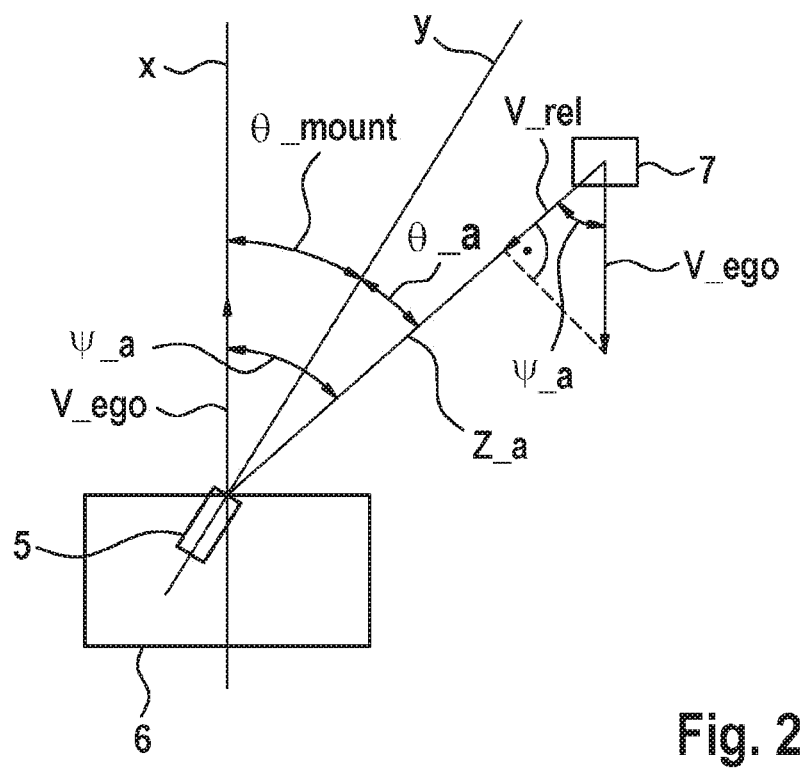
FIG. 2 shows a first possible relative positioning of the radar device and a possible object as a function of a measured relative speed.

A first possible position is illustrated in FIG. 2. Radar device 5 is installed in a vehicle 6, and a main direction of radiation Y of radar device 5 encloses mounting angle $\theta\_mount$ with vehicle axis, or longitudinal axis X of vehicle 6. Vehicle 6 moves along vehicle axis X with intrinsic speed v_ego. Because object 7 is a stationary target, in the coordinate system of vehicle 6 it moves with negative intrinsic speed −v_ego. A projection onto a first connecting line Z_a between radar device 5 and object 7 corresponds to relative speed v_rel. Main direction of radiation Y encloses a first azimuth angle θ_a with first connecting line Z_a, object 7 being situated on a side of main direction of radiation Y facing away from axis X. A first object angle ψ_a of object 7 between first connecting line Z_a and vehicle axis X is thus given as the sum of mounting angle θ_mount and first azimuth angle θ_a. Considered geometrically, first azimuth angle θ_a can be calculated according to the following equation:

$$\theta_a = \cos^{-1}\left(\frac{-v_{rel}}{v_{ego}}\right) - \theta_{mount}$$

Figure 3:
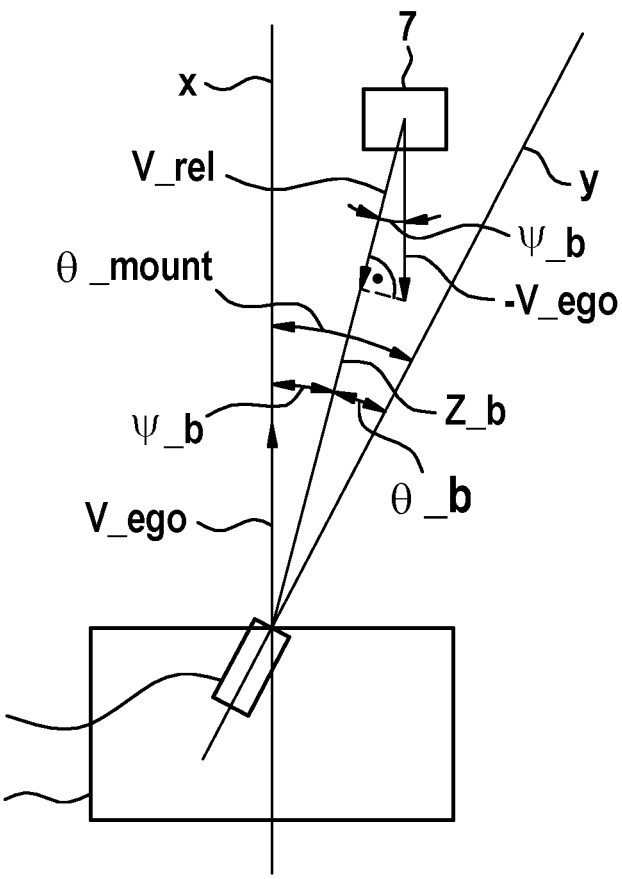
FIG. 3 shows a second possible relative positioning of the radar device and a possible object as a function of a measured relative speed.

A second possible situation is illustrated in FIG. 3. In this case, a second connecting line Z_b that connects object 7 to radar device 5 lies between main direction of radiation Y and vehicle axis X. A second azimuth angle θ_b between main direction of radiation Y and second connecting line Z_b is given as the difference between mounting angle θ_mount and a second object angle ψ_b, i.e. by the following equation:

$$\theta_b = -\left(\cos^{-1}\left(\frac{-v_{rel}}{v_{ego}}\right) - \theta_{mount}\right)$$

According to a specific embodiment, computing device 3 first checks whether an actual azimuth angle of object 7, acquired on the basis of the radar data, corresponds to first azimuth angle θ_a or to second azimuth angle θ_b.

In general, relative speed v_rel and intrinsic speed v_ego of vehicle 6 are subject to error. According to further specific embodiments, computing device 3 therefore checks whether the actual azimuth angle of object 7 acquired on the basis of the radar data lies in a first angular region α or in a second angular region β.

Figure 4:
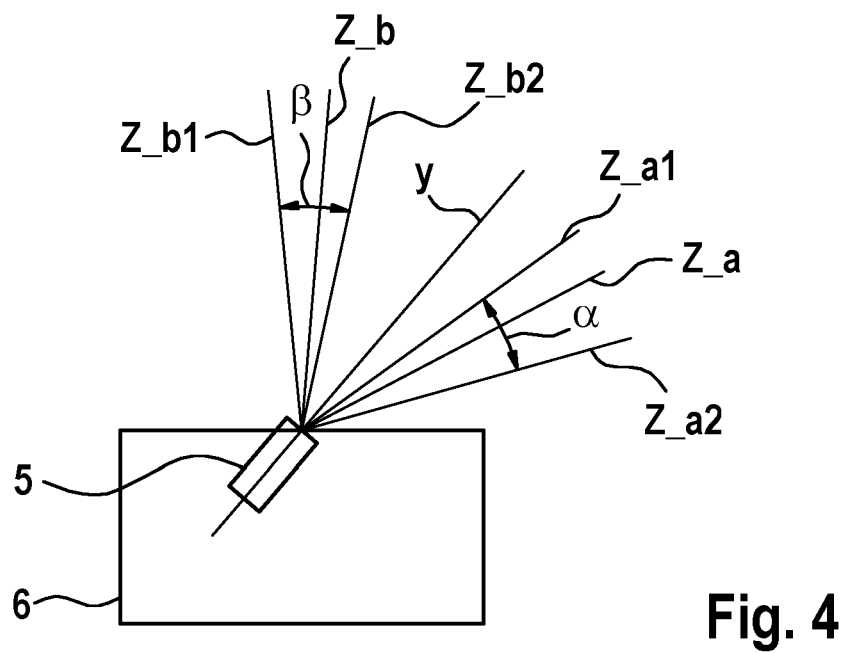
FIG. 4 shows an illustration of corresponding angular test regions.

In FIG. 4, the two angular regions are illustrated. First angular region α extends between a first axis Z_a1 and a second axis Z_a2 around first connecting line Z_a. The corresponding azimuth angles relative to main direction of radiation Y lie between a first value $$\cos^{-1}\left(\frac{-v_{rel} + \sigma_{rel}}{v_{ego} - \sigma_{ego}}\right) - \theta_{mount}$$

and a second value $$\cos^{-1}\left(\frac{-v_{rel} + \sigma_{rel}}{v_{ego} - \sigma_{ego}}\right) - \theta_{mount}$$

Here, σ_rel designates the uncertainty of the relative speed v_rel, while σ_ego designates the uncertainty of intrinsic speed v_ego of vehicle 6.

Correspondingly, second angular region β extends between a third axis Z_b1 and a fourth axis Z_b2 around second connecting line Z_b. The corresponding azimuth angles relative to main direction of radiation Y lie between a first value $$-\left(\cos^{-1}\left(\frac{-v_{rel} + \sigma_{rel}}{v_{ego} - \sigma_{ego}}\right) - \theta_{mount}\right)$$

and a second value $$-\left(\cos^{-1}\left(\frac{-v_{rel} + \sigma_{rel}}{v_{ego} - \sigma_{ego}}\right) - \theta_{mount}\right)$$

For certain constellations, the two angular regions α, β overlap. In this case, the two angular regions α, β are combined to form an overall angular region.

In each case, computing device 3 ascertains an angular quality measure, i.e., a variable that indicates whether object 7 is actually in the respective angular region α, β. If the angular quality measure exceeds a specified value, then computing device 3 determines that object 7 is a stationary target.

Otherwise, computing device 3 recognizes that a stationary target is not present, and carries out an angular estimation outside the two angular regions α, β.

Thus, on the one hand an evaluation of the angular position can be understood as meaning that it is checked whether what is concerned is an angular position of a stationary object. On the other hand, the precise azimuth angle can also be calculated.

Figure 5:
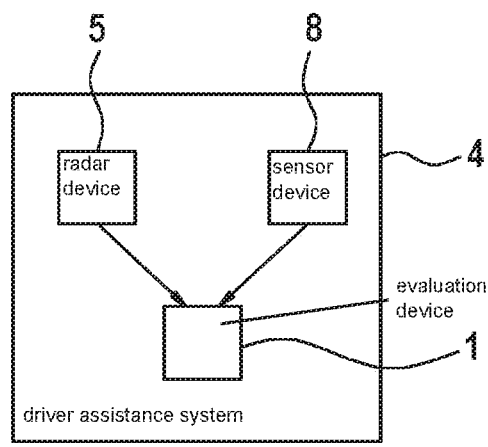
FIG. 5 shows a schematic diagram of a driver assistance system according to a specific embodiment of the present invention.

FIG. 5 illustrates a schematic diagram of a driver assistance system 4 according to a specific embodiment of the present invention. Driver assistance system 4 has a radar device 5 that is installed in vehicle 6. Radar device 5 transmits radar data, and recognizes an object 7 on the basis of the radar data. Driver assistance system 4 further has a device 1 that evaluates the angular position on the basis of the radar data.

Figure 6:
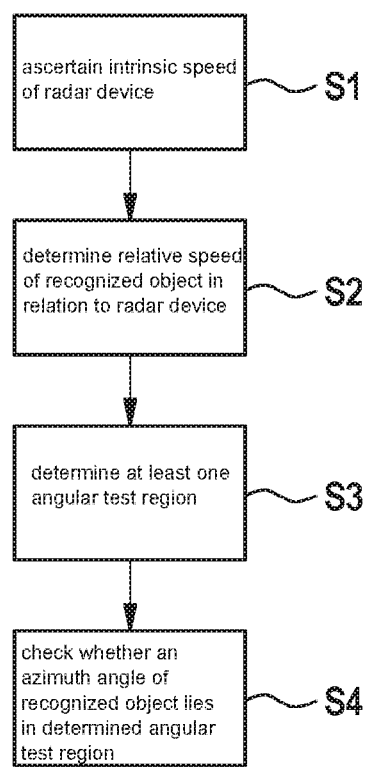
FIG. 6 shows a flow diagram of a method for evaluating an angular position of an object according to a specific embodiment of the present invention.

FIG. 6 illustrates a flow diagram of an example method in accordance with the present invention for evaluating an angular position of an object 7.

In a method step S1, an intrinsic speed v_ego of radar device 5 is ascertained. In particular, radar device 5 can be integrated into a vehicle 6, and intrinsic speed v_ego of vehicle 6 can be calculated by a speed sensor of vehicle 6.

In a method step S2, a relative speed v_rel of recognized object 7 in relation to radar device 5 is determined using the ascertained radar data.

In a further step S3, at least one angular test region α, β is determined as a function of intrinsic speed v_ego, relative speed v_rel, and, if applicable, a mounting angle θ_mount of radar device 5. Angular test region α, β corresponds to possible stationary objects 7, and inaccuracies of intrinsic speed v_ego and relative speed v_rel can be taken into account in accordance with the procedures described above.

In a method step S4, it is checked whether an azimuth angle of recognized object 7 lies in the ascertained angular test region α, β.

What is claimed is:

1. A method for evaluating an angular position of an object recognized based on radar data, the radar data being ascertained by a radar device, the method comprising the following steps:
    ascertaining an intrinsic speed of the radar device;
    ascertaining a relative speed of the recognized object in relation to the radar device, using the ascertained radar data;
    ascertaining, based on the ascertained intrinsic speed and the ascertained relative speed, a range of potential azimuth angles between (a) a line from the radar device to the recognized object and (b) a main direction of radiation output by the radar device, the range of potential azimuth angles being an angular test region;
    ascertaining a likelihood value that represents how likely an actual azimuth angle of the recognized object, which has not been calculated, is within the angular test region;
    ascertaining whether the likelihood value is greater than a predefined threshold; and
    in response to a result of the likelihood ascertainment being that the likelihood is not greater than the predefined threshold, determining a value of the actual azimuth angle.

2. The method as recited in claim 1, wherein the angular test region is determined additionally based on a mounting angle of the radar device relative to a longitudinal angle of a vehicle on which the radar device is mounted.

3. The method as recited in claim 1, wherein the angular test region is ascertained taking into account a predefined degree of inaccuracy of the ascertained intrinsic speed and a predefined degree of inaccuracy of the ascertained relative speed to thereby obtain maximum and minimum values of the range corresponding to a maximum potential deviation that can be caused by the predefined degrees of inaccuracy.

4. The method as recited in claim 1, wherein the range includes two angles that correspond to the ascertained relative speed and the ascertained intrinsic speed without any variation due to the inaccuracy.

5. The method as recited in claim 1, wherein the range includes two separately calculated angle ranges that overlap so that all of the angles of the range are contiguous by a combination of the two separately calculated angle ranges.

6. The method as recited in claim 1, wherein the range includes two separately calculated and non-contiguous angle ranges that are calculated for a radar of the radar device located at a single position of a vehicle.

7. A device for evaluating an angular position of an object recognized based on radar data of a radar device, the device comprising:
    an interface configured to receive the radar data and an identification of an intrinsic speed of the radar device; and
    a computing device configured to:
        ascertain a relative speed of the recognized object in relation to the radar device using the ascertained radar data;
        ascertain, based on the ascertained intrinsic speed and the received relative speed, a range of potential azimuth angles between (a) a line from the radar device to the recognized object and (b) a main direction of radiation output by the radar device, the range of potential azimuth angles being an angular test region;
        ascertain a likelihood value that represents how likely an actual azimuth angle of the recognized object, which has not been calculated, is within the angular test region;
        ascertain whether the likelihood value is greater than a predefined threshold; and
        in response to a result of the likelihood ascertainment being that the likelihood is not greater than the predefined threshold, determine a value of the actual azimuth angle.

8. A driver assistance system for a vehicle, comprising:
    a radar device configured to ascertain radar data and to recognize an object based on the radar data; and
    a device for evaluating an angular position of the object recognized based on the radar data, the device including:
        an interface configured to receive the radar data and an identification of an intrinsic speed of the radar device; and
        a computing device configured to:
            ascertain a relative speed of the recognized object in relation to the radar device using the ascertained radar data;
            ascertain, based on the ascertained intrinsic speed and the received relative speed, a range of potential azimuth angles between (a) a line from the radar device to the recognized object and (b) a main direction of radiation output by the radar device, the range of potential azimuth angles being an angular test region;
            ascertain a likelihood value that represents how likely an actual azimuth angle of the recognized object, which has not been calculated, is within the angular test region;
            ascertain whether the likelihood value is greater than a predefined threshold; and
            in response to a result of the likelihood ascertainment being that the likelihood is not greater than the predefined threshold, determine a value of the actual azimuth angle.

* * * * *